(12) United States Patent
Lundy et al.

(10) Patent No.: US 10,045,596 B2
(45) Date of Patent: Aug. 14, 2018

(54) UTILITY BAG WITH HARD TOP BODY

(71) Applicant: Plano Molding Company, Plano, IL (US)

(72) Inventors: Matthew Lundy, Yorkville, IL (US); John H. Whalen, Sheridan, IL (US); Ryan Olander, Oswego, IL (US)

(73) Assignee: PLANO MOLDING COMPANY, Plano, IL (US)

( * ) Notice: Subject to any disclaimer, the term of this patent is extended or adjusted under 35 U.S.C. 154(b) by 2 days.

(21) Appl. No.: 15/188,336

(22) Filed: Jun. 21, 2016

(65) Prior Publication Data
US 2016/0374440 A1    Dec. 29, 2016

Related U.S. Application Data

(60) Provisional application No. 62/183,881, filed on Jun. 24, 2015.

(51) Int. Cl.
*A45C 5/06* (2006.01)
*A45C 13/00* (2006.01)
(Continued)

(52) U.S. Cl.
CPC .............. *A45C 5/06* (2013.01); *A01K 97/06* (2013.01); *A45C 5/02* (2013.01); *A45C 13/005* (2013.01); *A45C 13/103* (2013.01); *A45C 13/1092* (2013.01); *A45C 13/36* (2013.01); *A45C 2013/1015* (2013.01); *A45C 2200/10* (2013.01)

(58) Field of Classification Search
CPC ..... A45C 11/20; A45C 5/106; A45C 2200/10; A45C 13/103; A45C 5/08; A45C 5/06; A45C 13/005

USPC ......... 190/111, 112, 903, 109; 220/521, 524, 220/592.21
See application file for complete search history.

(56) References Cited

U.S. PATENT DOCUMENTS

| 1,577,566 A | 3/1926 | Cryder |
| 2,629,644 A | 2/1953 | Heys |

(Continued)

FOREIGN PATENT DOCUMENTS

| JP | 07-050968 A | 2/1995 |
| JP | 11-155451 A | 6/1999 |

(Continued)

OTHER PUBLICATIONS

PCT International Searching Authority, PCT International Search Report and Written Opinion, PCT Application No. PCT/US2016/038555, dated Oct. 23, 2016.

*Primary Examiner* — Sue A Weaver
(74) *Attorney, Agent, or Firm* — Leason Ellis LLP

(57) ABSTRACT

A utility bag with a main body having a plurality of walls that form a main storage space, an opening formed at a top portion of the main body and exposing the main storage space, and a hard top body pivotally connected to the main body to cover or expose the opening of the main body. The hard top body includes a base comprised of a plastic material and shaped to cover the opening of the main body, the base having one or more storage compartments, and one or more hatches pivotally connected to the base to cover the one or more storage compartments. A zipper is attached to the main body and the hard top body, wherein the zipper is stitched directly to the plastic material of the base.

20 Claims, 7 Drawing Sheets

(51) Int. Cl.
*A45C 13/10* (2006.01)
*A45C 5/02* (2006.01)
*A45C 13/36* (2006.01)
*A01K 97/06* (2006.01)

(56) References Cited

U.S. PATENT DOCUMENTS

| | | | |
|---|---|---|---|
| 3,301,619 A | 1/1967 | Mead | |
| 3,330,608 A | 7/1967 | Druger | |
| 3,606,511 A | 9/1971 | Henning | |
| 3,623,580 A * | 11/1971 | Toller | A45C 5/00 190/115 |
| 3,948,579 A | 4/1976 | Schirmer | |
| 3,985,409 A | 10/1976 | Kneier | |
| 4,118,086 A | 10/1978 | Kneier | |
| 4,765,470 A | 8/1988 | Curci | |
| 4,782,619 A | 11/1988 | Richards | |
| 5,176,281 A | 1/1993 | Fiore | |
| 5,205,429 A | 4/1993 | Woolworth et al. | |
| 5,426,885 A | 6/1995 | Wittman | |
| 5,475,943 A | 12/1995 | Hodges | |
| D389,309 S | 1/1998 | Shaw | |
| D414,934 S | 10/1999 | Dickinson et al. | |
| 6,161,665 A | 12/2000 | Hoover | |
| 6,409,066 B1 * | 6/2002 | Schneider | A45F 3/02 190/110 |
| D465,330 S | 11/2002 | Parker | |
| D468,531 S | 1/2003 | Hsu | |
| 7,168,204 B2 | 1/2007 | Wieringa et al. | |
| 7,219,969 B2 | 5/2007 | Bezzubov | |
| 7,246,704 B2 | 7/2007 | Brunson et al. | |
| 7,278,234 B2 | 10/2007 | Marino | |
| D579,202 S | 10/2008 | Grenier et al. | |
| D600,912 S | 9/2009 | Brunner | |
| D613,944 S | 4/2010 | Molina | |
| D617,987 S | 6/2010 | Wang | |
| 7,748,158 B2 | 7/2010 | Wieringa et al. | |
| D629,199 S | 12/2010 | Minneman | |
| D637,812 S | 5/2011 | Horiyama et al. | |
| 7,937,884 B1 | 5/2011 | Naylor et al. | |
| D641,160 S | 7/2011 | Minneman | |
| D643,216 S | 8/2011 | Greiner | |
| D645,663 S | 9/2011 | Henley | |
| D647,303 S | 10/2011 | Mish | |
| D650,173 S | 12/2011 | Lima | |
| D650,585 S | 12/2011 | Jamison et al. | |
| D659,396 S | 5/2012 | Hsu | |
| D660,440 S | 5/2012 | Roehrig et al. | |
| D679,908 S | 4/2013 | Hurt et al. | |
| D712,141 S | 9/2014 | Minneman | |
| D724,842 S | 3/2015 | Whalen | |
| D730,051 S | 5/2015 | Whalen | |
| 9,066,566 B2 * | 6/2015 | Lai | A45C 13/001 |
| D733,429 S | 7/2015 | Grenier | |
| D754,968 S | 5/2016 | Whalen | |
| 2002/0079313 A1 | 6/2002 | Grayson | |
| 2004/0074936 A1 * | 4/2004 | McDonald | A45C 11/20 224/148.5 |
| 2005/0247596 A1 * | 11/2005 | Manley | A45C 11/20 206/775 |
| 2006/0175213 A1 * | 8/2006 | Hurt | A01K 97/06 206/315.11 |
| 2011/0186396 A1 * | 8/2011 | Sheikh | A45C 13/10 190/111 |
| 2013/0341338 A1 * | 12/2013 | Mitchell | A45C 11/20 220/592.2 |
| 2014/0224608 A1 * | 8/2014 | Tang | A45C 5/03 190/124 |
| 2015/0342317 A1 * | 12/2015 | Barmes | A45C 5/03 190/18 A |
| 2016/0029756 A1 * | 2/2016 | Lai | A45C 5/06 190/111 |

FOREIGN PATENT DOCUMENTS

| | | |
|---|---|---|
| JP | 4459825 B2 | 4/2010 |
| KR | 10-2006-0086819 A | 8/2006 |
| WO | 2001056377 | 8/2001 |
| WO | 2007083392 | 7/2007 |

* cited by examiner

UTILITY BAG WITH HARD TOP BODY

CROSS REFERENCE TO PRIOR APPLICATIONS

This application claims priority to and the benefit thereof from U.S. Provisional Patent Application No. 62/183,881 filed on Jun. 24, 2015, titled "HARD TOP STORAGE," the entirety of which is hereby incorporated herein by reference.

FIELD OF THE DISCLOSURE

The present disclosure relates generally to a portable storage unit, and more specifically it relates to a utility bag for outdoor/recreational activities.

BACKGROUND OF THE DISCLOSURE

Tackle bags are very popular in the fishing industry. Tackle bags are typically comprised of a molded plastic box and a fabric bag having a main compartment that holds the molded plastic box. The molded plastic box typically has a plurality of compartments for storing tackles, lures and/or other finishing equipment. The fabric bag also typically has a cover or top that is opened or closed by a zipper, buttons or other fasteners. To access the compartments of the molded plastic box, the cover or top needs to be removed by unzipping the zipper or unlocking the buttons. Accordingly, there is a need for a fishing bag that allows quick access to commonly used tackle, lures and other small and large fishing equipment stored in the various compartments without scarifying durability and portability thereof.

SUMMARY OF THE DISCLOSURE

One aspect of the present disclosure provides a utility bag having a main body, the utility bag comprising: a plurality of walls that form a main storage space; an opening formed at a top portion of the main body and exposing the main storage space; a hard top body pivotally connected to the main body to cover or expose the opening of the main body, the hard top body comprising: a base comprised of a plastic material and shaped to cover the opening of the main body, the base comprising one or more storage compartments; and one or more hatches pivotally connected to the base to cover the one or more storage compartments; and a zipper attached to the main body and the hard top body, wherein the zipper is stitched directly to the plastic material of the base.

According to another aspect of the disclosure, a utility bag is provided having a main body that includes a main storage space and an opening exposing the main storage space, the utility bag comprising: a hard top body connected to the main body and comprising one or more storage compartments; and a connector attached to the main body and the hard top body to keep the hard top body covering the opening of the main body, wherein the connector comprises a zipper stitched to a substantially hard plastic material that forms a base of the hard top body, and that allows the hard top body to pivotally move with respect to the main body.

The hard top body may comprise: a base shaped to cover the opening of the main body and comprising the one or more storage compartments; and one or more hatches pivotally connected to the base to cover the one or more storage compartments.

According to a still further aspect of the disclosure, a hard top body is provided for a utility bag, comprising: a base formed of a hard plastic and shaped to cover an opening of the utility bag and comprising one or more storage compartments; and one or more hatches pivotally connected to the base to cover the one or more storage compartments, wherein the hard plastic of the base is stitched to a zipper.

The hard top body may be formed of molded plastic.

The hard top body may comprise a raised middle portion that forms one or more hinge connections with the one or more hatches.

The one or more hatches may be transparent or translucent.

The hard top body may comprise a fastener that keeps the one or more hatches closed.

The utility bag may comprise a hinge connector coupled between the main body and the hard top body.

The zipper may comprise a pair of sliders.

The hard top body may comprise a fastener that keeps the one or more hatches closed. The fastener may comprise a pressure fit clip.

Additional features, advantages, and embodiments of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

Figure 1:
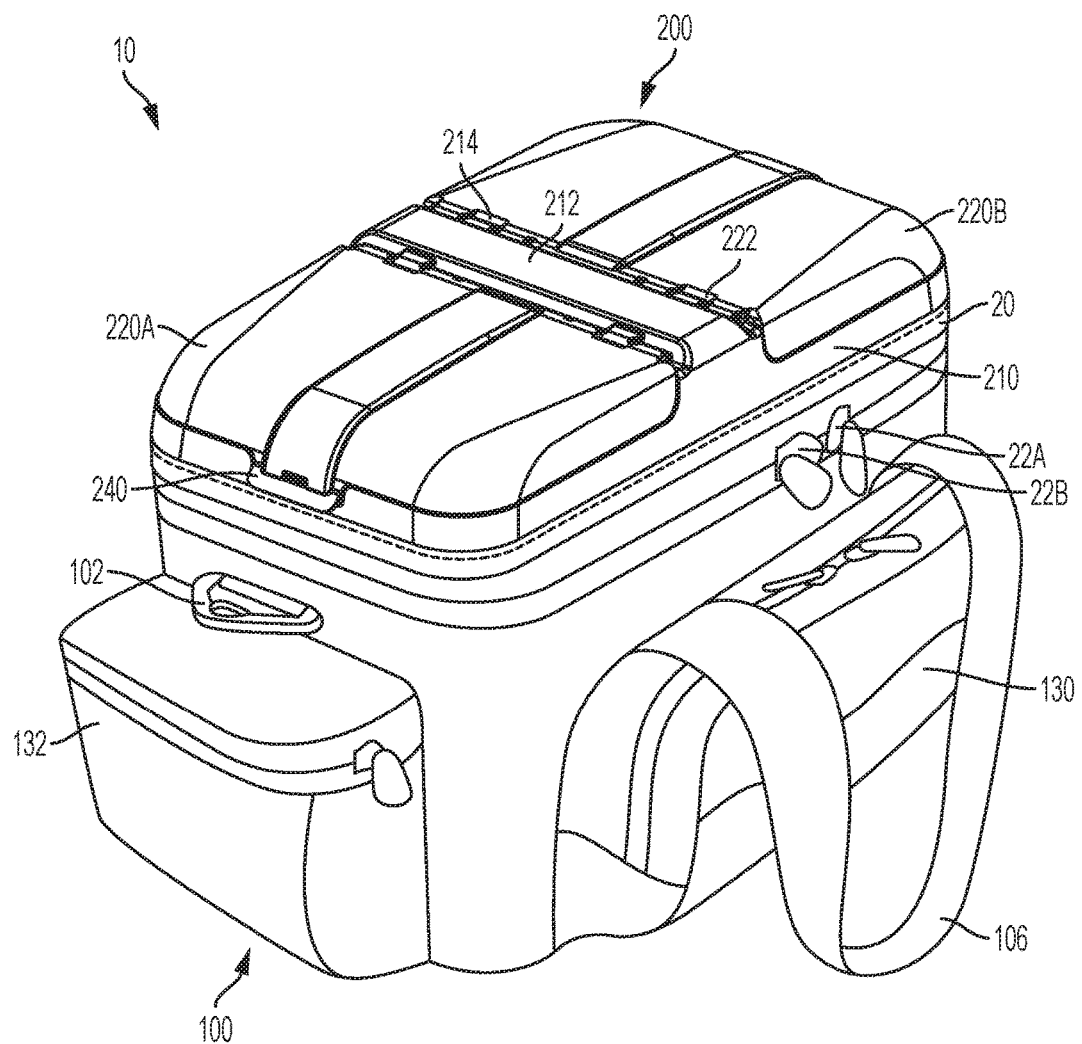
FIG. 1 shows a perspective view of a utility bag constructed according to the principles of the disclosure.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The terms "including," "comprising" and variations thereof, as used in this disclosure, mean "including, but not limited to," unless expressly specified otherwise.

The terms "a," "an," and "the," as used in this disclosure, mean "one or more," unless expressly specified otherwise.

Devices that are in communication with each other need not be in continuous communication with each other, unless expressly specified otherwise. In addition, devices that are in direct contact with each other may contact each other directly or indirectly through one or more intermediary articles or devices.

Although process steps, method steps, or the like, may be described in a sequential order, such processes and methods may be configured in alternate orders. In other words, any sequence or order of steps that may be described does not necessarily indicate a requirement that the steps be performed in that order. The steps of the processes or methods described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device or article may be alternatively embodied by one or more other devices or articles which are not explicitly described as having such functionality or features.

FIG. 1 shows a perspective view of a utility bag 10, constructed according to the principles of the disclosure. The utility bag 10 may be used for various outdoor/recreational activities, such as, for example, fishing, hunting, camping, photography, and/or the like. The utility bag 10 may be used for other activities, such as, for example, construction, maintenance and repairing, and the like. The utility bag 10 includes a main body 100 and a hard top body 200. The main body 100 may have a main storage space 110 (shown in FIG. 2). The hard top body 200 may provide additional easy-to-access storage space. For example, when the utility bag 10 is used as a fishing bag, the hard top body 200 may be used to hold fishing equipment, such as, for example, tackles, lures, hooks, and/or the like. The hard top body 200 may also be used to hold other items, such as, for example, mobile phone, flash light, wallet, fishing license card, and/or the like.

Figure 2:
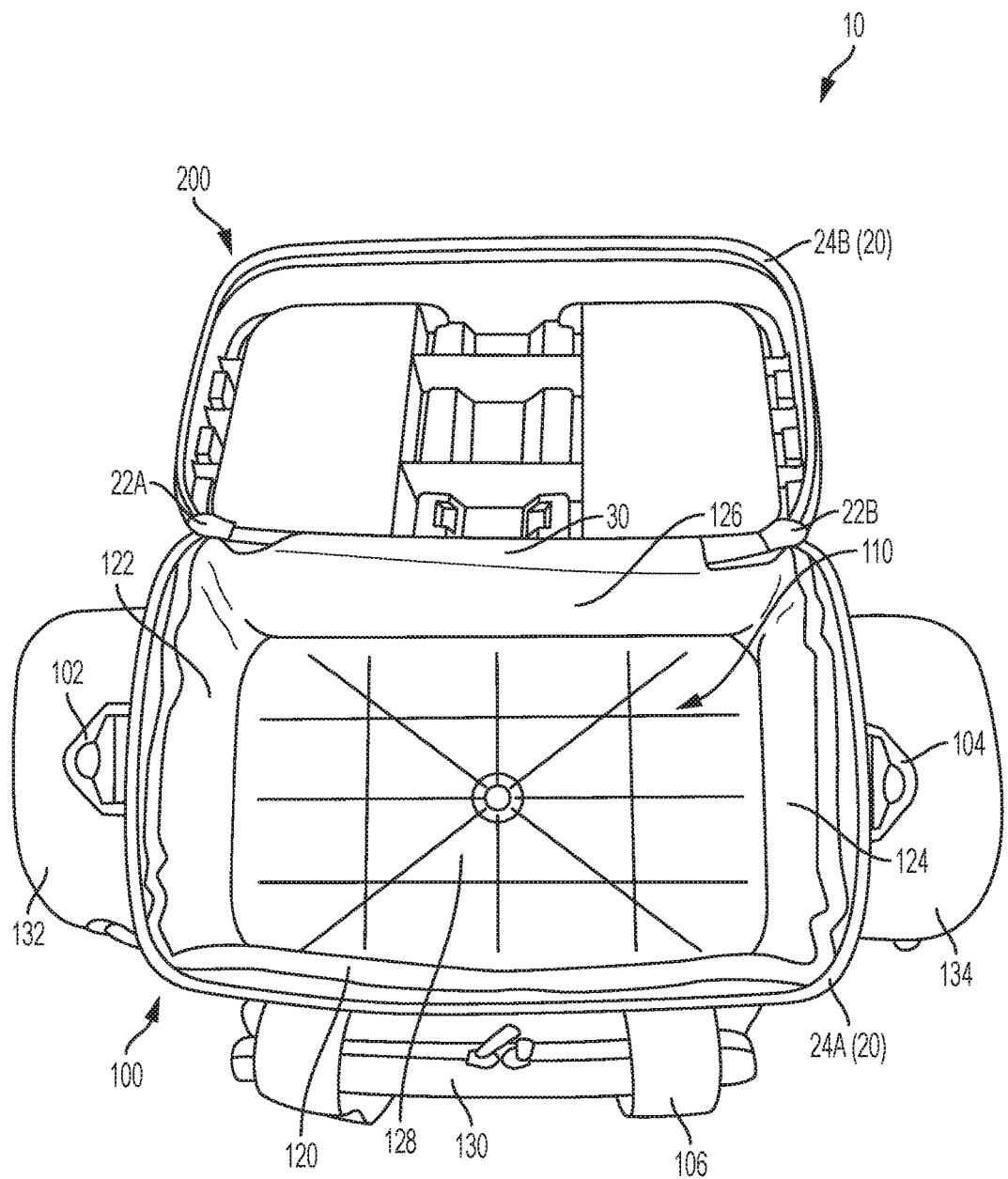
FIG. 2 shows a top view of the utility bag of FIG. 1 with a hard top body in an open position.

FIG. 2 shows a top view of the utility bag 10 with the hard top body 200 in an open position. Referring to FIGS. 1 and 2 concurrently, the main body 100 may include a plurality of walls, such as for example, front wall 120, sidewalls 122, 124, rear wall 126, and bottom wall (or floor) 128, which may form a main storage space 110 of the main body 100. The walls 120, 122, 124, 126 and 128 may be constructed of a single material or a variety of materials, which may be selected from, for example, woven fabric, cloth, canvas, plastic, rubber, metal, wood, high tensile strength synthetic fibers, or the like, or any combination thereof. The walls 120, 122, 124, 126, and 128 may be constructed as a structure having a single layer of the material, or a structure that has multiple layers of one or more materials.

Top portions of the front wall 120, sidewalls 122, 124, and rear wall 126 may form an opening of the main body 100 that exposes the main storage space 110. When the hard top body 200 is closed (shown in FIG. 1), the hard top body 200 may cover the opening of the main body 100, and the main storage space 110 may be completely surrounded or encapsulated. The utility bag 10 may include a hinge connector 30 coupled between the main body 100 and the hard top body 200. The hinge connector 30 may be attached to the rear wall 126 of the main body 100 such that the hard top body 200 may pivot about a longitudinal axis of the rear wall 126, being pivotally moveable toward the rear wall 126 of the main body 100 when the hard top body 200 is being opened.

The main body 100 may include a container (not shown) that has four walls and a floor, which may be constructed as a single piece (e.g., using known molding or metal forming processes) or assembled from multiple pieces. The container may have a substantially rectangular shape, having four walls and a floor that form a storage space. The container may be made of a material, such as, for example, plastic, metal, wood, or the like. The container may be inserted into, or integrally formed with the main storage space 110. In this regard, the walls 120, 122, 124, 126, 128 of the main body 100 may include the walls of the container. Alternatively, the walls 120, 122, 124, 126, or 128 may be constructed so as to envelope the walls of the container. For example, the walls 120, 122, 124, 126, or 128 may be formed to have openings (not shown) to receive the walls of the container.

The main body 100 may be formed with water-proof and/or water-resistant material, such as, for example, vinyl, Gore-Tex™, Fluoropolymer fabric, Latex, natural or artificial rubber, and/or the like. The main body 100 may be formed of a material that includes, for example, cloth, canvas, denim, woven fabrics, or the like. The bottom wall 128 (and/or the walls 120, 122, 124, 126) may be formed of one or more harder materials, such as, for example, plastic, rubber, or the like, to support one or more items placed thereon in the main storage space 110, to block water or moisture from seeping into or out of the main storage space 110, or to hold fluids in the main storage space 100. The bottom wall 128 may be integrally formed with the walls 120, 122, 124, 126 to provide a storage space that can, for example, hold a fluid such as water.

The main body 100 may include additional storage space (s). For example, as seen in FIGS. 1 and 2, the main body 100 may include one or more pockets, such as, for example, front pocket 130, side pockets 132, 134, and/or the like, which may be located on an exterior surface of the main body 100. The front pocket 130 may be formed on the front wall 120 of the main body 100. The side pockets 132, 134 may be formed on the side walls 122, 124 of the main body 100, respectively. Additionally or alternatively, the main body 100 may have additional storage space on an interior surface thereof (not shown).

The main body 100 may include one or more connectors, such as, for example, hooks 102, 104 and/or the like, to connect, for example, a strap (not shown) thereto. The hooks 102, 104 may be attached to, or integrally formed with the side walls 122, 124 of the main body 100, respectively, such that the strap attached thereto may extend along a longitudinal direction of the utility bag 10. The main body 100 may include one or more handles such that a user may carry the utility bag 10 with a hand. For example, the main body 100 may include a pair of handles 106 (only one shown), which may be attached to the front and rear walls 120, 126 of the main body 100, respectively.

Figure 3:
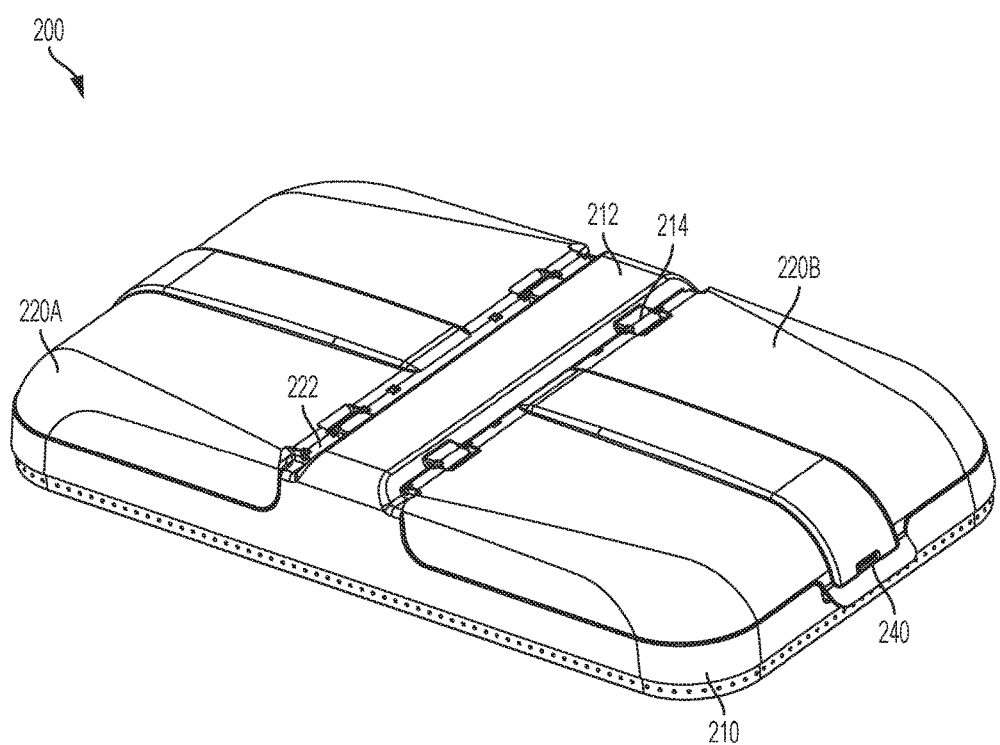
FIG. 3 shows a perspective view of the hard top body of FIG. 1.
Figure 4:
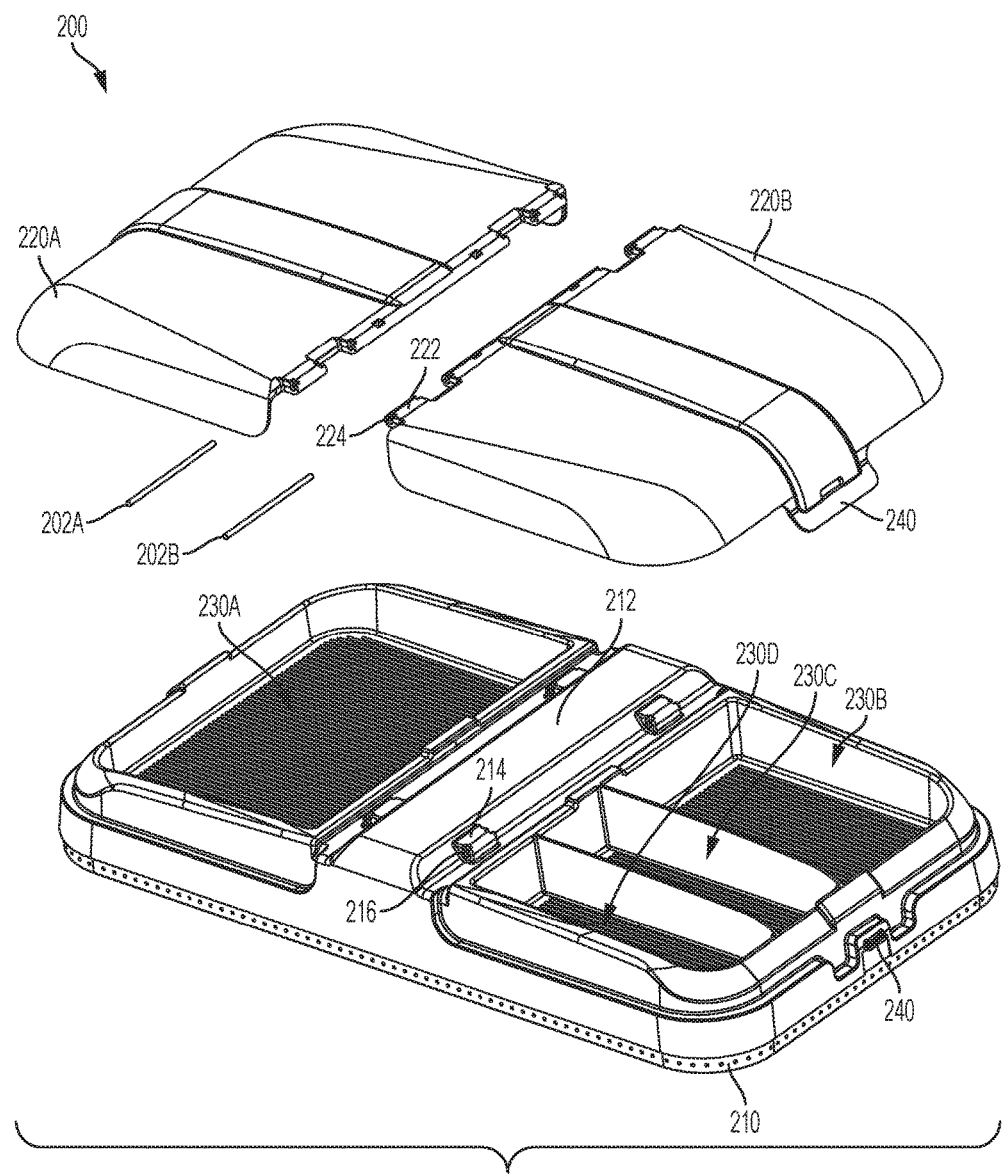
FIG. 4 shows an exploded perspective view of the hard top body of FIG. 1.

FIG. 3 shows a perspective view of the hard top body 200, constructed according to the principles of the disclosure. FIG. 4 shows an exploded perspective view of the hard top body 200. Referring to FIGS. 3 and 4 concurrently, the hard top body 200 may include a base 210, one or more hatches (for example, first hatch 220A, second hatch 220B. The hard top body 200 may be formed by assembling multiple pieces, such as, for example, base 210, hatches 220A, 220B, and/or the like, to form a unitary structure. Alternatively, the entire hard top body 200 may be formed as a single piece by means of, for example, plastic molding.

The base 210 may be formed of a hard material, such as, for example, plastic, metal, alloy, wood, or the like. For example, the base 210 may be formed of molded plastic having a predetermined shape (e.g., the shape shown in FIGS. 3-4). A bottom portion of the base 210 may be shaped to cover the opening of the main body 100 such that the main storage space 110 may be completely surrounded or encapsulated when the hard top body 200 is closed, as seen in FIG. 1.

The top portion of the hard top body 200 may be shaped to form one or more storage compartments for quick access, which may be constructed to have different sizes and shapes. For example, the hard top body 200 may include a large compartment 230A, a medium compartment 230B, two small compartments 230C, 230D and/or the like. The storage compartments 230A, 230B, 230C, 230D may hold various items of different sizes and shapes, such as, for example, tackles, lures, hooks, mobile phone, flash light, wallet, fishing license card, and/or the like. The medium compartment 230B may be about a half the size of the large compartment 230A. Each of the small compartments 230C, 230D may be a half the size of the medium compartment 230B. Alternatively, the shapes and sizes of the storage compartments 230A, 230B, 230C, 230D may be customizable, for example, by inserting or removing dividers (not shown). The items stored in the storage compartments 230A, 230B, 230C, 230D may be secured when the hatches 220A, 220B are closed, which is shown in FIG. 3.

The base 210 may include a raised middle portion 212 that may extend perpendicular to a longitudinal direction of the base 210. The raised middle portion 212 may be located between the large compartment 230A and the middle and small compartments 230B, 230C, 230D. The raised middle portion 212 may be formed in a different shape, size and direction. For example, the raised portion 212 may be formed along the longitudinal direction of the base 210, which may change the shape and size of the storage compartments 230A, 230B, 230C, 230D.

The first and second hatches 220A, 220B may be formed of hard material, such as, for example, plastic, metal, alloy or the like. For example, similar to the base 210, the hatches 220A, 220B may be formed of molded plastic to have a predetermined shape. The hatches 220A, 220B may be transparent or translucent such that the items stored in the storage compartments 230A, 230B, 230C, 230D may be visible and easily identifiable from the outside when the hatches 220A, 220B are closed.

The first and second hatches 220A, 220B may form hinge connections with the base 210. For example, the raised middle portion 212 may include one or more tabs 214 on both sides thereof. Each tab 214 may include a through-hole 216. Also, each of the first and second hatches 220A, 220B may include on or more tabs 222. Each of the tabs 222 may include a through-hole 224. As seen in FIG. 3, the tabs 214 of the raised middle portion 212 and the tabs 222 of the second hatch 220B may be alternatingly arranged, and the through holes 216 of the tabs 214 and the through holes 224 of tabs 222 may be aligned together. One or more axle pins, such as, for example, pin 202B or the like may be inserted into the alternatingly aligned through holes 216, 224, thereby forming a hinge connection. The first hatch 220A may be pivotally connected to the raised middle portion 212 in a similar manner, by using one or more axle pins, for example, pin 202A or the like.

The hinge connection may be formed in a different manner. For example, the raised middle portion 212 may be formed by, for example, molding or the like, to include a pair of cylindrical-shaped recesses (not shown) at both end portions thereof. The first hatch 220A may be formed to include a pair of protrusions (not shown) shaped to fit the recesses of the raised middle portion 212, respectively. Axle pins (not shown) may be integrally formed with or attached to the hatches 220A, 220B and/or the hard top body 200, and a clasp portion (not shown) may be integrally formed with or attached to the hard top body 200 and/or hatches 220A, 220B, respectively, so as to attach to the axle pins and allow the hatches 220A, 220B to pivotally turn about the axis of the axle pins. The first hatch 220A may be pivotally attached to the raised middle portion 212 once the pair of protrusions are snapped into the pair of the recesses (or the clasp portion is snapped onto the axle pins). The recesses may be formed at the hatches 220A, 220B and the protrusions may be formed at the raised middle portion 212. Alternatively, the first and second hatches 220A, 220B and the raised middle portion 212 may be integrally formed as a single piece by, for example, molding or the like, with folding lines therebetween. Accordingly, the hinge connections may be formed in a simple manner without, for example, the tabs 214, 222, the through holes 216, 224, the pins 202A, 202B, and/or the like.

Figure 5:
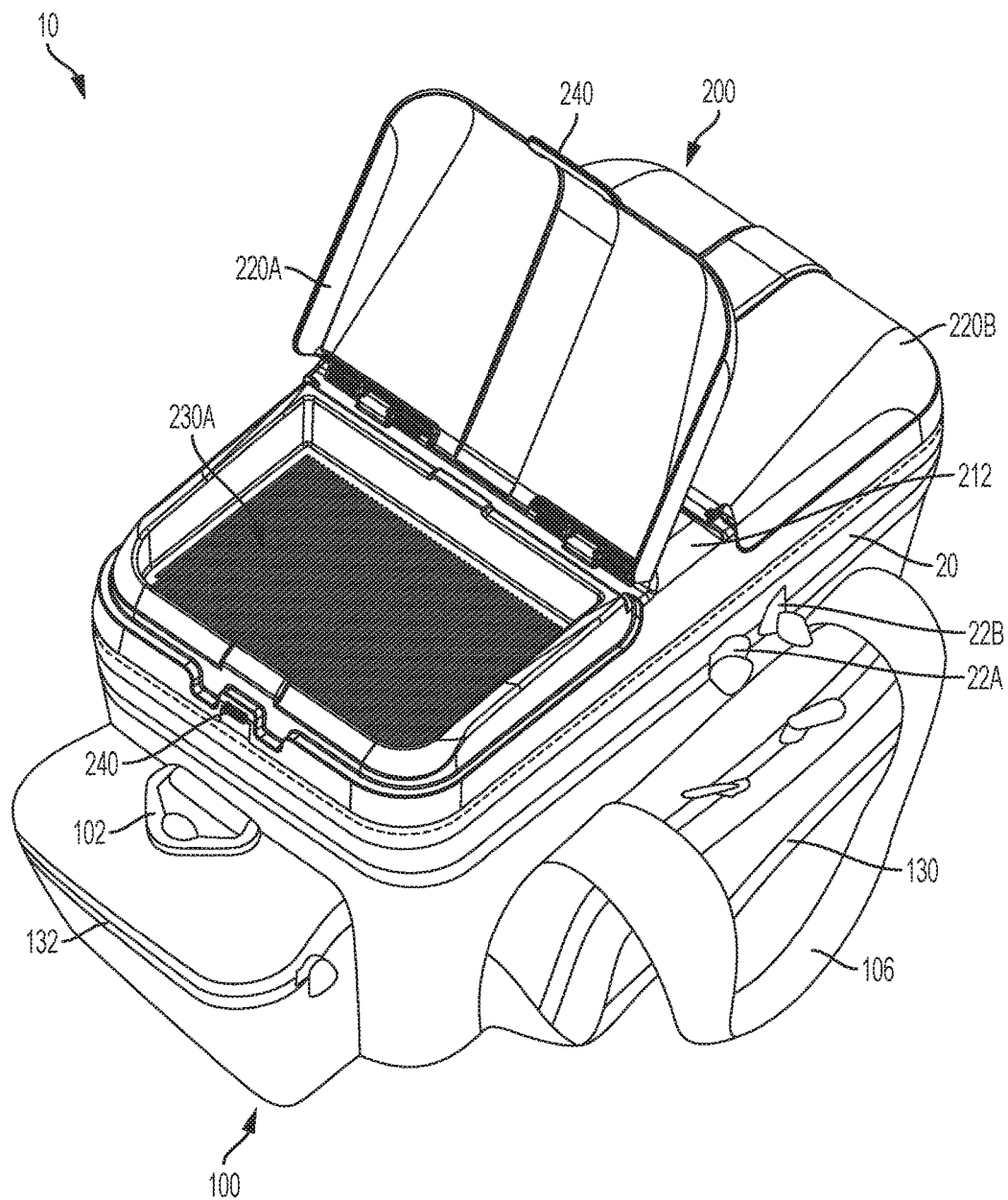
FIG. 5 shows a perspective view of the utility bag of FIG. 1 with a first hatch of the hard top body in an open position.

FIG. 5 shows the first hatch 220A in an open position to expose the large compartment 230A.

Figure 6:
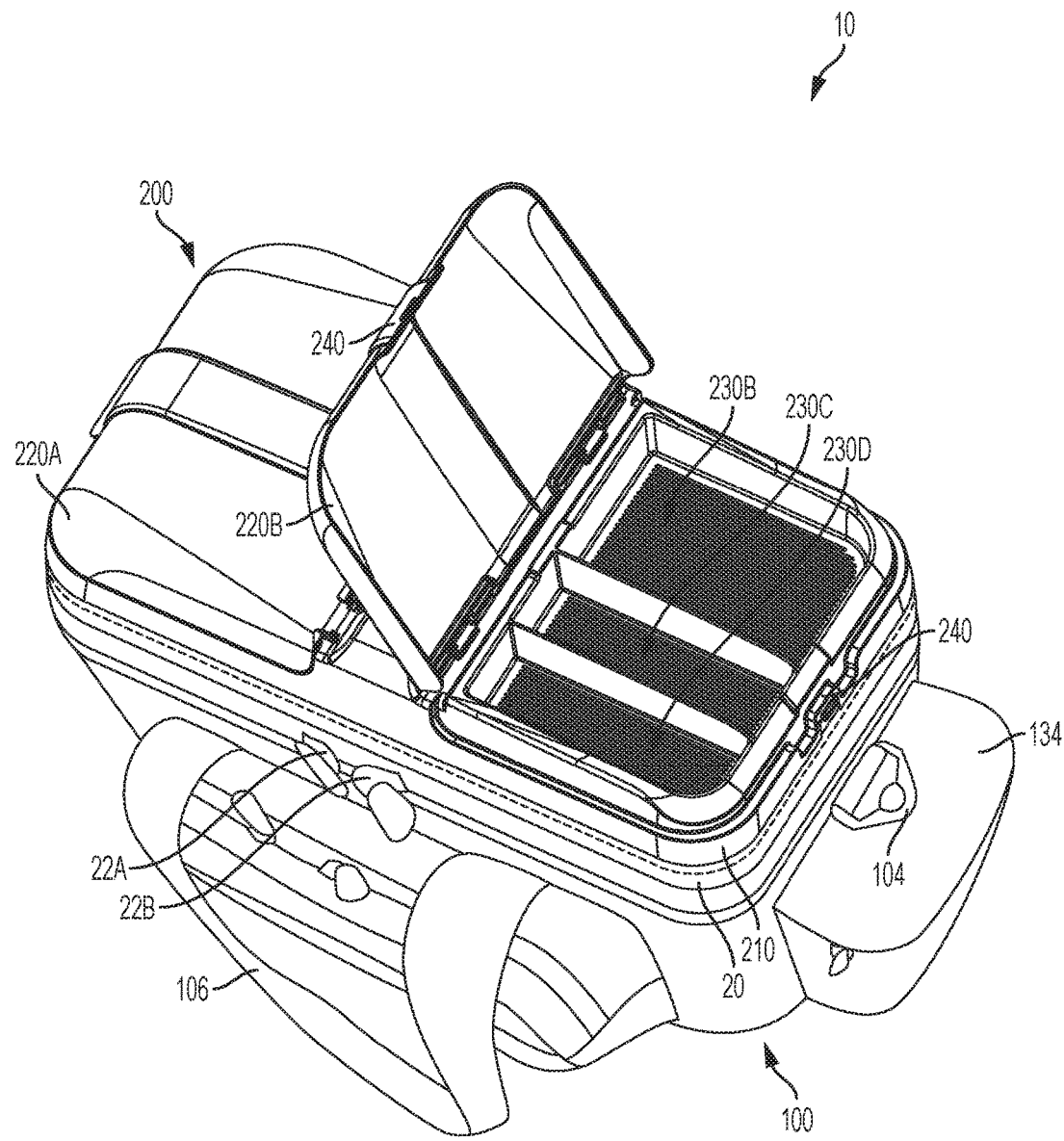
FIG. 6 shows a perspective view of the utility bag of FIG. 1 with a second hatch of the hard top body in an open position.

FIG. 6 shows the second hatch 220B in an open position to expose the medium and small compartments 230B, 230C, 230D.

The hard top body 200 may further include a fastening mechanism, such as, for example, a clip, a latch, a lock, a button, or the like, to keep the first and second latches 220A, 220B closed. For example, as seen in FIG. 3, the hard top body 200 may include pressure fit clips 240 to keep the hatches 220A, 220B from coming open.

The hard top body 200 may be detachably or removably attached to the main body 100 such that the user may access the main storage space 110 by opening or removing the hard top body 200. For example, the utility bag 10 may include one or more connectors, such as, for example, a zipper, a button, a latch, a hook-and-loop fastener (i.e., Velcro™), a hook-and-eye closure, a snap fastener, a clip, a pin, a buckle, a clasp, a belt, or the like, such that the hard top body 200 may be opened or removed to expose the main storage space 110 of the main body 100. FIGS. 1 and 2 show a zipper 20 being used as the connector. The zipper 20 may have one or more sliders. For example, the zipper 20 may include two sliders 22A, 22B, which may make it easier for the user to open and close the zipper 20.

Figure 7:
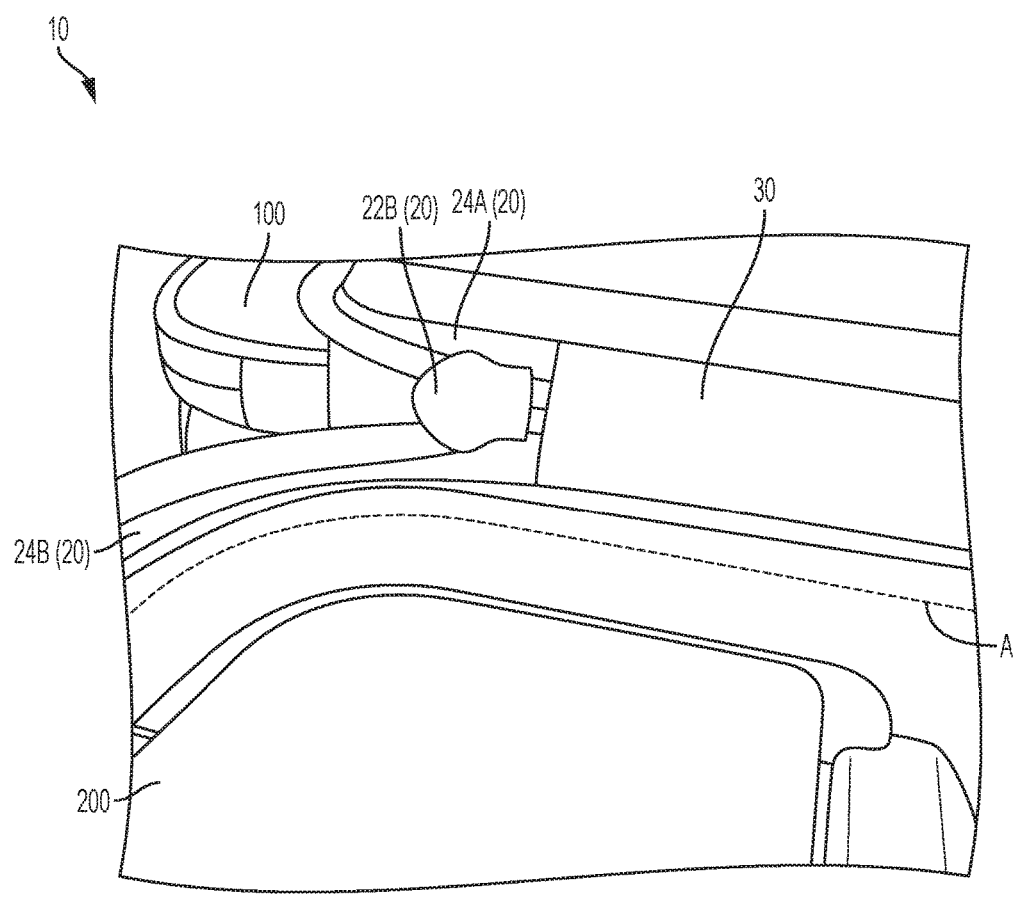
FIG. 7 shows the utility bag of FIG. 1 with a zipper stitched to the hard top body.

As seen in FIG. 7, the zipper 20 may include a lower tape 24A and an upper tape 24B, which may be attached to the top portion of the main body 100 and the bottom portion of the hard top body 200, respectively. The lower and upper tapes 24A, 24B may be stitched to the main body 100 and the hard top body 200, respectively. As seen in FIG. 7, for example, the hard top body 200 and the upper tape 24B may be stitched together by a stitching A. Alternatively, the tapes 24A, 24B may be glued or riveted to the main body 100 and the hard top body 200, respectively. The lower tape 24A may be integrally formed with the main body 100.

The hard top body 200 may be formed of a relatively hard material. By stitching the zipper 20 directly to the hard top body 200, the hard top body 200 may stay on the main body 100 and function as a top cover for the main storage space 110 while providing additional easy-to-access storage space formed thereon, such as, for example, storage compartments 230A, 230B, 230C, 230D. In this regard, the tape 24B may be stitched or sewn directly to and along a perimeter of the base 210 (shown in FIG. 4) using, for example, a high strength needle and thread. The base 210 may be fabricated with holes along the perimeter to receive the stitching and fasten to the tape 24B of the zipper 20.

With the easy-to-open fastening mechanism, such as, for example, pressure fit clips 240, the user may easily access the storage compartments 230A, 230B, 230C, 230D of the hard top body 200; and, with the easy-to-open zipper 20, the user may easily open and access the storage compartment 110 in the main body 10. Accordingly, the utility bag 10 may allow quick access to commonly used items, such as, for example, tackle, lures and other small and large fishing equipment without scarifying durability and portability thereof.

While the disclosure has been described in terms of exemplary embodiments, those skilled in the art will recognize that the disclosure can be practiced with modifications in the spirit and scope of the appended claim, drawings and attachment. The examples provided herein are merely illustrative and are not meant to be an exhaustive list of all possible designs, embodiments, applications or modifications of the disclosure.

What is claimed is:

1. A utility bag having a main body, the utility bag comprising:
    a plurality of walls that form a main storage space of the main body, the plurality of walls comprising a plurality of fabric sidewalls;
    an opening formed at a top portion of the main body and exposing the main storage space;
    a hard top body pivotally connected to the main body to cover or expose the opening of the main body, the hard top body comprising:
        a base comprised of a plastic material and shaped to cover the opening of the main body, the base comprising one or more storage compartments; and
        one or more hatches pivotally connected to the base to cover the one or more storage compartments; and
    a zipper attached to the main body and the hard top body, wherein the zipper is stitched directly to the plastic material of the base and the plurality of fabric sidewalls.

2. The utility bag of claim 1, wherein the hard top body is formed of molded plastic.

3. The utility bag of claim 1, wherein the one or more hatches are transparent or translucent.

4. The utility bag of claim 1, wherein the base further comprises a raised portion that forms one or more hinge connections with the one or more hatches.

5. The utility bag of claim 1, wherein the hard top body further comprises a fastener that keeps the one or more hatches closed.

6. The utility bag of claim 5, wherein the fastener comprises a pressure fit clip.

7. The utility bag of claim 1, wherein the zipper comprises a pair of sliders.

8. The utility bag of claim 1, further comprising a hinge connector coupled between the main body and the hard top body.

9. A utility bag having a main body that includes a main storage space and an opening exposing the main storage space, the utility bag comprising:
    a hard top body connected to the main body and comprising one or more storage compartments; and
    a connector attached to the main body and the hard top body to keep the hard top body covering the opening of the main body,
    wherein the connector comprises a zipper stitched to a substantially hard plastic material that forms a base of the hard top body, and that allows the hard top body to pivotally move with respect to the main body,
    wherein the main body comprises a plurality of fabric sidewalls that surround the main storage space, and
    wherein the zipper is stitched to the plurality of fabric sidewalls.

10. The utility bag of claim 9, wherein the hard top body is formed of molded plastic.

11. The utility bag of claim 9, wherein the hard top body comprises:
    a base shaped to cover the opening of the main body and comprising the one or more storage compartments; and
    one or more hatches pivotally connected to the base to cover the one or more storage compartments.

12. The utility bag of claim 11, wherein the one or more hatches are transparent or translucent.

13. The utility bag of claim 11, wherein the hard top body further comprises a raised portion that forms one or more hinge connections with the one or more hatches.

14. The utility bag of claim 11, wherein the hard top body further comprises a fastener that keeps the one or more hatches closed.

15. The utility bag of claim 14, wherein the fastener comprises a pressure fit clip.

16. A hard top body for a utility bag, comprising:
    a base formed of a hard plastic and shaped to cover an opening of the utility bag, the base comprising one or more storage compartments and a raised portion laterally adjoining the one or more storage compartments; and
    one or more hatches pivotally connected to the raised portion to cover the one or more storage compartments,
    wherein the hard plastic of the base is stitched to a connector.

17. The hard top body of claim 16, wherein the hard top body is formed of molded plastic.

18. The hard top body of claim 16, wherein the raised portion forms one or more hinge connections with the one or more hatches.

19. The hard top body of claim 16, wherein the one or more hatches are transparent or translucent, and
    wherein the hard top body comprises a connector that comprises at least one of a button, a latch, a hook-and-loop fastener, a hook-and-eye closure, a snap fastener, a clip, a pin, a buckle, a clasp and a belt.

20. The hard top body of claim 16, further comprising a fastener that keeps the one or more hatches closed.

* * * * *